United States Patent [19]
Creedon

[11] Patent Number: 4,693,281
[45] Date of Patent: Sep. 15, 1987

[54] VARIABLE MODULUS FILAMENT WOUND PRESSURE TUBE

[75] Inventor: Richard L. Creedon, San Diego, Calif.

[73] Assignee: GA Technologies Inc., San Diego, Calif.

[21] Appl. No.: 778,696

[22] Filed: Sep. 23, 1985

[51] Int. Cl.⁴ .............................................. F16L 11/08
[52] U.S. Cl. .................................... 138/174; 138/172; 138/130; 138/153; 138/DIG. 2
[58] Field of Search ............... 138/129, 130, 172, 174, 138/DIG. 2, 153, 124, 125, 126, 127; 64/1 S, 2 R, 1 R

[56] References Cited

U.S. PATENT DOCUMENTS

| | | |
|---|---|---|
| 2,747,616 | 5/1956 | De Ganahl .......................... 138/130 |
| 2,825,364 | 3/1958 | Cullen et al. ...................... 138/130 X |
| 3,566,924 | 3/1971 | Ambrus et al. ..................... 138/130 |
| 4,089,190 | 5/1978 | Worgron et al. ................. 138/130 X |

Primary Examiner—James E. Bryant, Jr.
Attorney, Agent, or Firm—Fitch, Even, & Tabin

[57] ABSTRACT

Filament wound pressure tube has layers of filaments wound helically. The filaments of each such layer are disposed at an angle to a line parallel to the longitudinal axis of said tube which angle is approximately equal to a respective angle $\theta$ to line, such angle $\theta$ being chosen such that the ratio $\sin^2\theta/r$ is approximately the same for all layers, where r is the radial distance from said axis to such layer.

7 Claims, 1 Drawing Figure

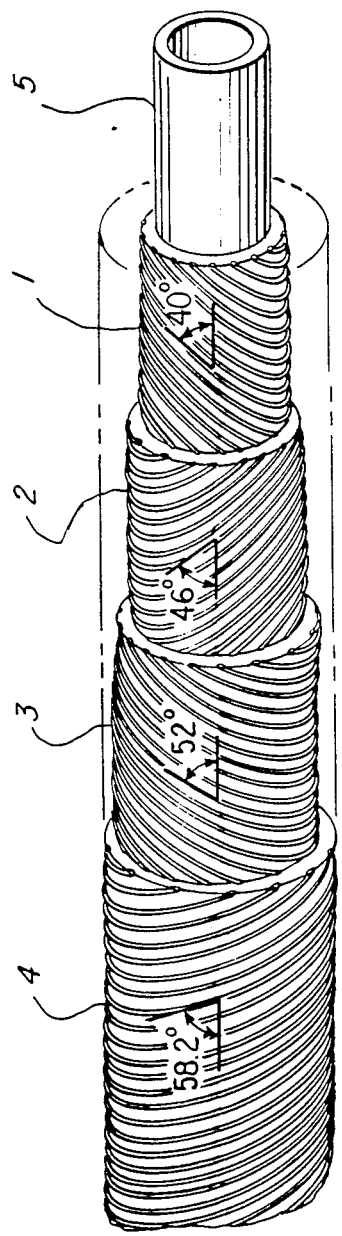

VARIABLE MODULUS FILAMENT WOUND PRESSURE TUBE

This invention relates to a filament-reinforced pressure tube and more particularly to a filament-reinforced pressure tube in which filaments are in several layers.

BACKGROUND OF INVENTION

It is well known in the art to wrap a pressure tube with filaments in order to increase the pressure retaining capabilities of the tube. Normally, only one helix angle is utilized in the wrapping. There are some examples in the prior art of more than one helix angle being utilized. For example, Carter, U.S. Pat. No. 3,303,079, discloses helical windings, followed by circular windings, then additional helical windings. Yates, U.S. Pat. No. 4,171,626, discloses a reinforced drive shaft where the innermost layer is disposed at an angle of ±30 degrees to ±50 degrees with respect to the longitudinal axis, the fibers of the outermost layer are disposed at an angle of 60 degrees to 90 degrees and the intermediate angel is disposed at an angle of 0 degrees to ±15 degrees.

A need exists for light weight pressure tubes which are capable of withstanding repeated enormous pressure pulses. One such application is for rail gun barrels for use in an orbital space station.

SUMMARY OF INVENTION

The inventor has discovered that the stress on each filament of a filament layer of a helically wound pressure tube of circular cross section is approximately proportional to $\sin^2 \theta/r$, where r is the radial distance from the longitudinal axis of the tube to the filament layer and $\theta$ is the angle generated by a tangent to the filament and a line parallel to the axis. Thus, all filaments can be wound so that they will be subject to approximately the same stress if disposed at such angles that $\sin^2 \theta/r$ is a constant for all layers. This permits the design of tubes of minimum weight capable of withstanding enormous pressures. Such tubes are especially valuable for space applications.

BRIEF DESCRIPTION OF THE DRAWING

The single figure is a perspective view in orthographic projection of a short length of a pressure tube accord with different layers of filament broken away.

DETAILED DESCRIPTION OF PREFERRED EMBODIMENT

A preferred embodiment of this invention can be described by reference to the drawing. As indicated above, the inventor has discovered that the stress in each filament in a filament layer of a helically wound pressure tube is approximately proportional to $\sin^2 \theta/r$, where r and $\theta$ are as defined above. The relation follows from the facts that (1) as a first approximation an internal pressure pulse will result in a constant increase in the radius of each layer of a helically wound pressure tube; and (2) the stress experienced by each fiber as a result of an incremental expansion of the tube radius is equal to $(E)(\Delta r/r)\sin^2 \theta$, where r and $\theta$ are as defined above, $\Delta r$ is the incremental increase in r, and E is Young's modulus. E and $\Delta r$ are approximately constant, therefore, the stress is approximately proportional to $\sin^2 \theta/r$.

In one preferred embodiment, as shown in the drawing, a 1.75 cm base radius pressure tube has been designed to withstand an internal pressure of 414 MPa (60 k.s.i.). This is accomplished by wrapping a removable mandril 5 with layers 1, 2, 3, and 4 of filaments of glass at 70% packing density in an epoxy matrix at four different angles as set forth in the following table:

| Layer | Radius, r (cm) of Layer Center | $\theta$ |
|---|---|---|
| 1 | 2.0 | 40.0 degrees |
| 2 | 2.5 | 46.0 degrees |
| 3 | 3.0 | 52.0 degrees |
| 4 | 3.5 | 58.2 degrees |

Each layer is approximately 0.5 cm thick and the stress on the filaments of each layer averages approximately 100,000 p.s.i. In an alternative embodiment the mandril is tubular and left in place. The maximum packing fraction for round filaments is about 90%, and with random winding the packing fraction would be about 60%.

In another preferred embodiment, a 2 cm base inside radius pressure tube has been designed to withstand an internal pressure of 45,000 p.s.i. The filament angle changes uniformly with radius in accordance with the above formula in order to maintain uniform stress. The inner and outer radii and filament angles are as set forth in the following table:

| Inner Radius = 2.0 cm, | $\theta$ = 45 degrees |
|---|---|
| Outer Radius = 3.5 cm, | $\theta$ = 70 degrees |

In this case the filament stress is approximately uniform at 717 MPa (104 k.s.i.).

For any particular application, persons skilled in the art will be able to decide how close the actual angle of each layer needs to be to the angle determined by $\sin^2 \theta/r$. For some applications it may be appropriate to control the angle to within ±1.0 degree or less but for other applications a 10 degree variation may be appropriate to reduce manufacturing cost. Manufacturing processes are available to control the angle to within ±1.0 degree without much difficulty.

While two preferred embodiments have been illustrated and described herein, there is no intent to limit the scope of the invention to those or any other particular embodiment.

I claim:

1. A filament wound pressure tube having a longitudinal axis comprising
at least two layers of glass filaments wound helically in an epoxy matrix to form said tube wherein the filaments of each such layer are disposed at an angle to a line parallel to the longitudinal axis of said tube which angle is approximately equal to a respective angle $\theta$ to said line parallel to said axis, such angle $\theta$ being chosen such that the ratio $\sin^2 \theta/r$ is approximately the same for all layers, where r is the radial distance from said axis to such layer.

2. The filament woumd tube in claim 2 wherein said filament of each layer is disposed at angles to a line parallel to the longitudinal axis of said tube which angles are within ±10 degrees of said angle $\theta$.

3. The tube in claim 1 wherein said at least two layers of filament are wound on a removable mandril.

4. The tube in claim 2 wherein said at least two layers of filament are wound on a tubular liner.

5. The tube in claim 1 wherein said at least two layers of filament are wound on a tubular liner.

6. The tube in claim 2 wherein said at least two layers of filaments are wound on a tubular liner.

7. The tube in claim 1 wherein said at least two layers of filament are wound of glass with a packing density of between 56% and 90%.

* * * * *

UNITED STATES PATENT AND TRADEMARK OFFICE
CERTIFICATE OF CORRECTION

PATENT NO. : 4,693,281
DATED : September 15, 1987
INVENTOR(S) : Richard L. Creedon It is certified that error appears in the above-identified patent and that said Letters Patent is hereby corrected as shown below:

In the Abstract:

Line 5, after "to" insert --the--.

In the Specification:

Column 1, line 23, change "angel" to --layer--;

line 45, delete "perspective";

line 47, change "accord" to --according to the present invention--;

line 65, after "constant" change the comma to a semicolon.

In the Claims:

Column 2, line 55, change "woumd" to --wound--;

line 66, change "filaments" to --filament--.

Signed and Sealed this

First Day of March, 1988

Attest:

DONALD J. QUIGG

Attesting Officer        Commissioner of Patents and Trademarks